Nov. 8, 1949 W. F. ALLER ET AL 2,487,629
GAUGING DEVICE FOR PISTON RINGS AND OTHER OBJECTS
Filed Oct. 26, 1945 7 Sheets-Sheet 2
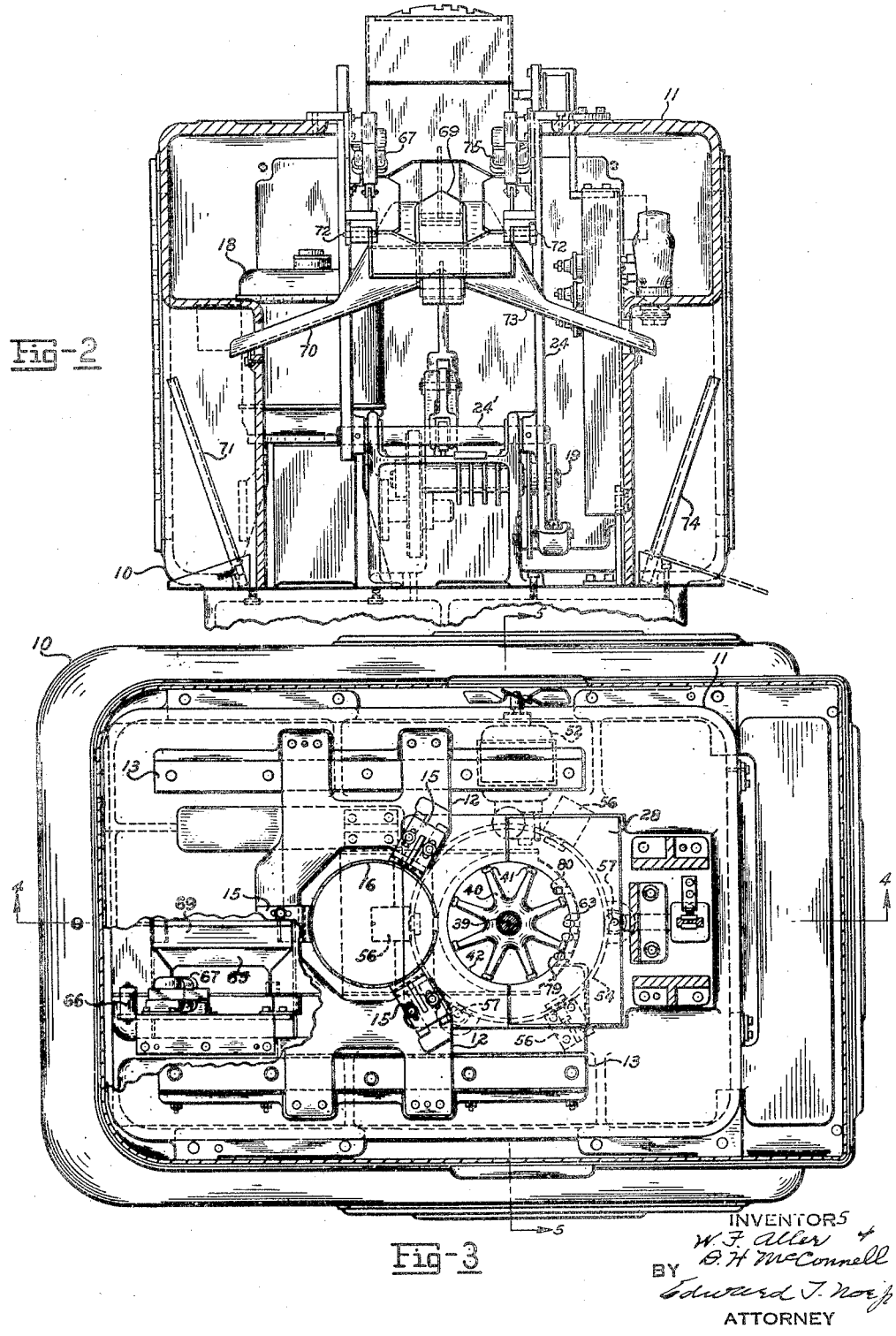
INVENTORS
W. F. Aller &
D. H. McConnell
BY
Edward T. Noip
ATTORNEY Nov. 8, 1949 W. F. ALLER ET AL 2,487,629
GAUGING DEVICE FOR PISTON RINGS AND OTHER OBJECTS
Filed Oct. 26, 1945 7 Sheets-Sheet 3
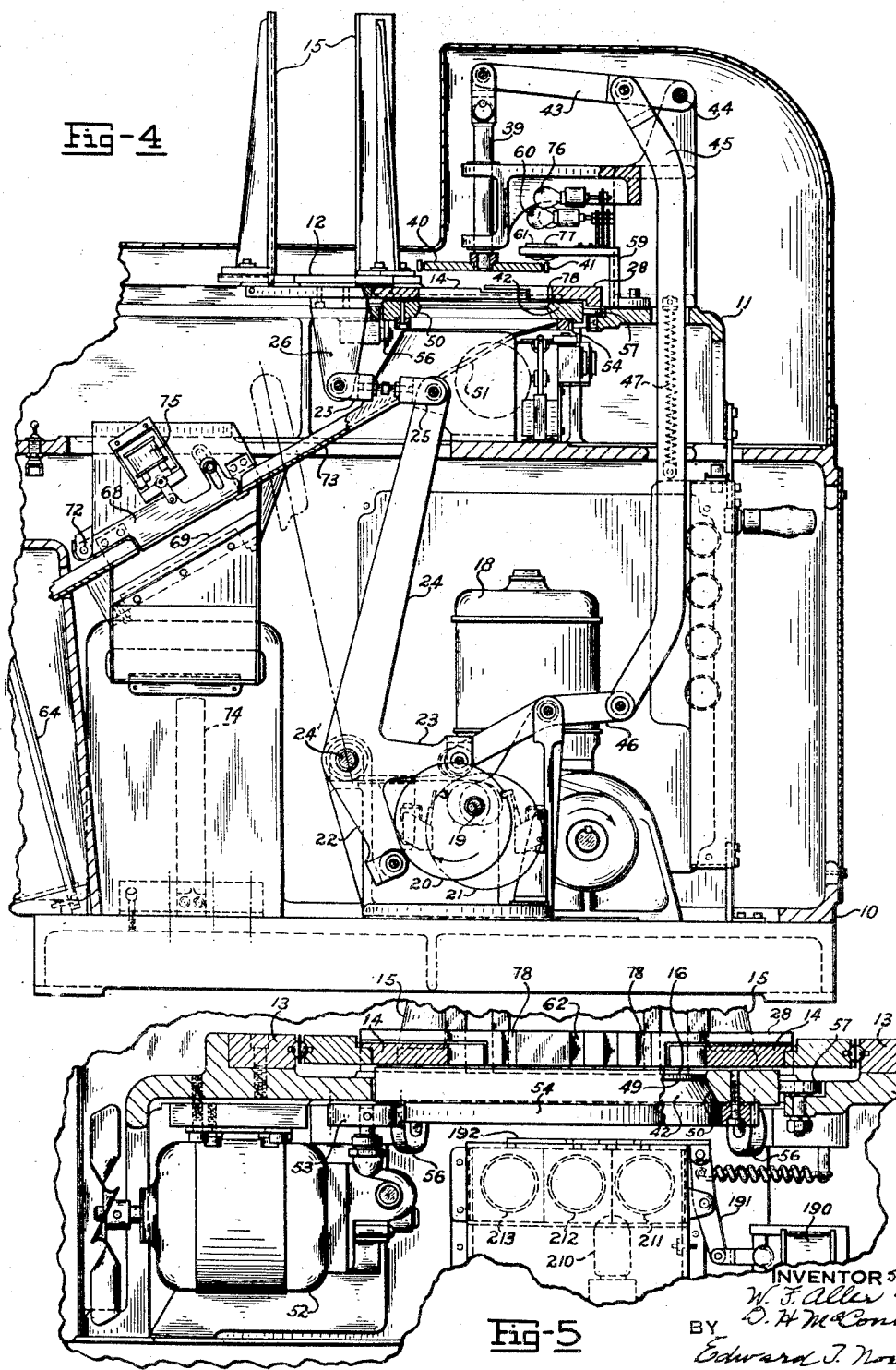

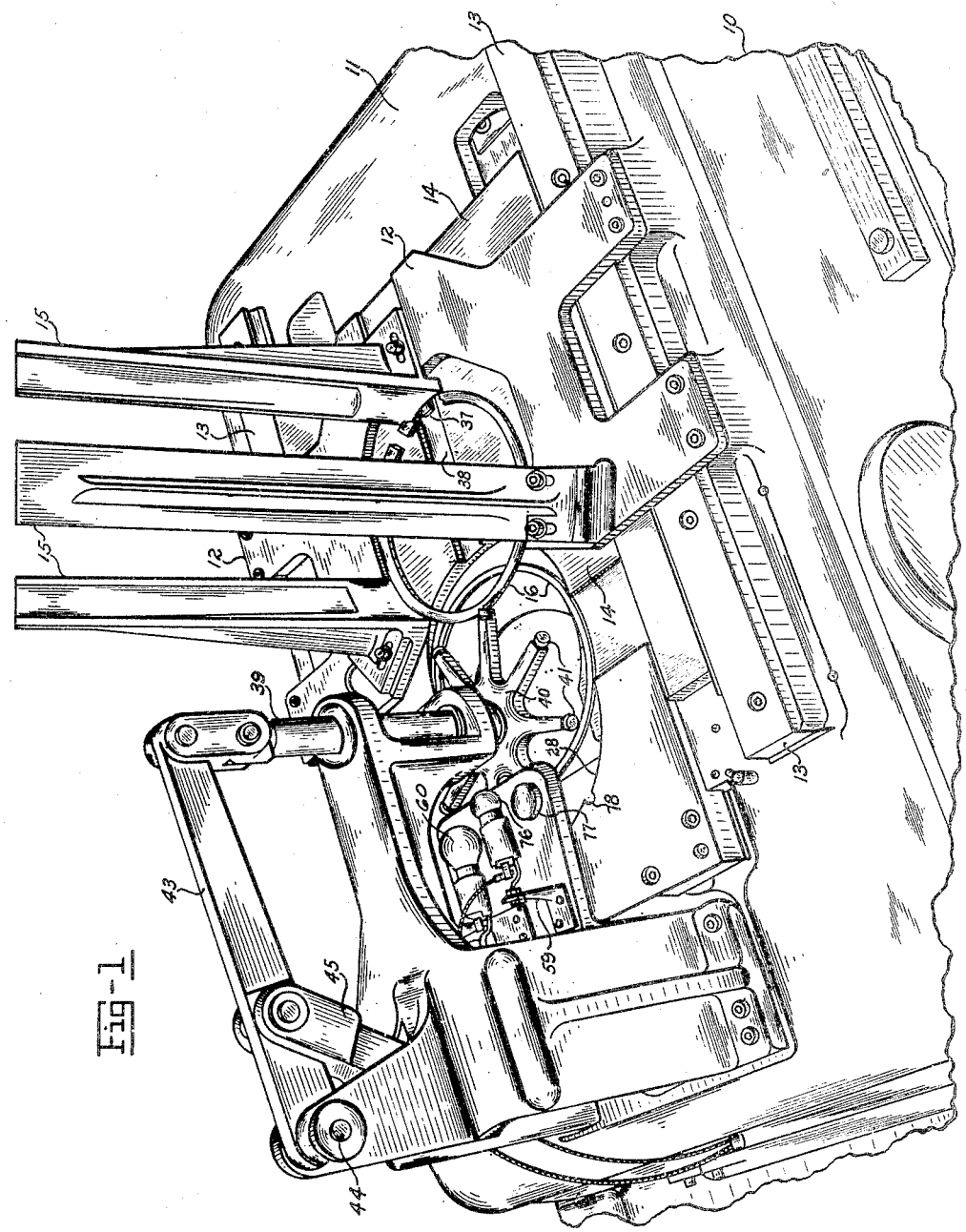

Nov. 8, 1949 W. F. ALLER ET AL 2,487,629
GAUGING DEVICE FOR PISTON RINGS AND OTHER OBJECTS
Filed Oct. 26, 1945 7 Sheets-Sheet 4
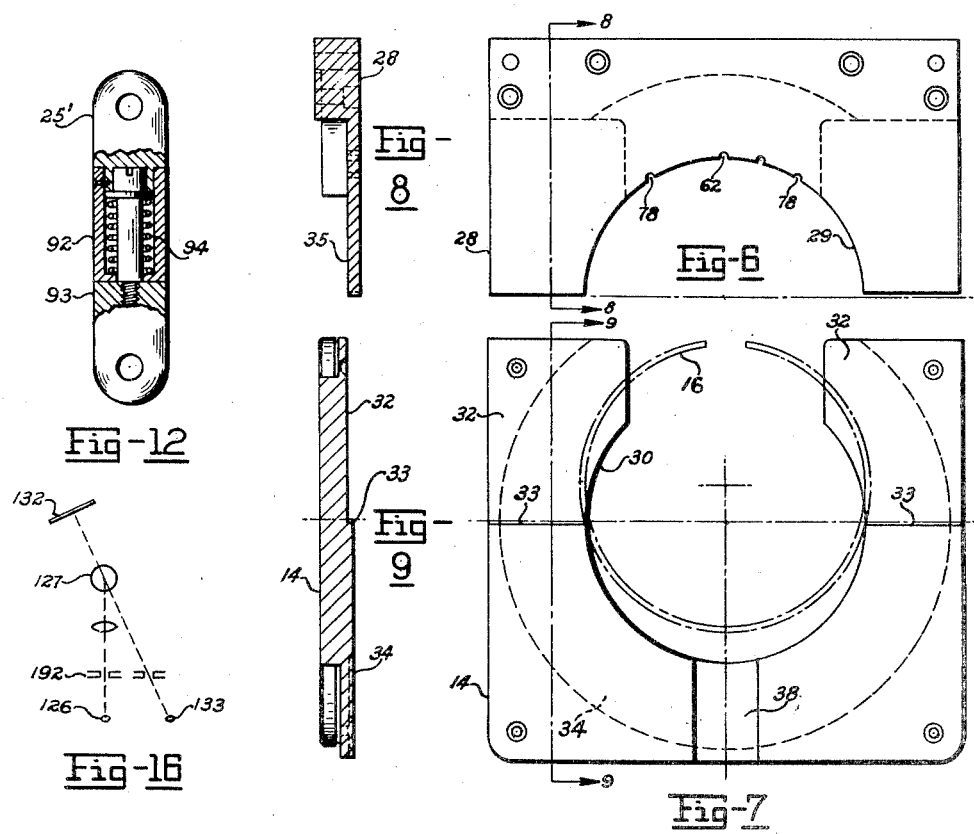
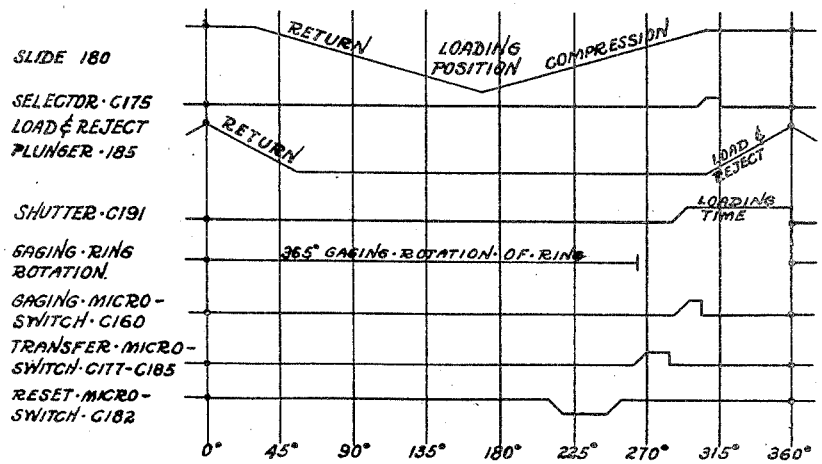
INVENTORS
W. F. Aller &
BY D. H. McConnell
Edward J. Noël
ATTORNEY

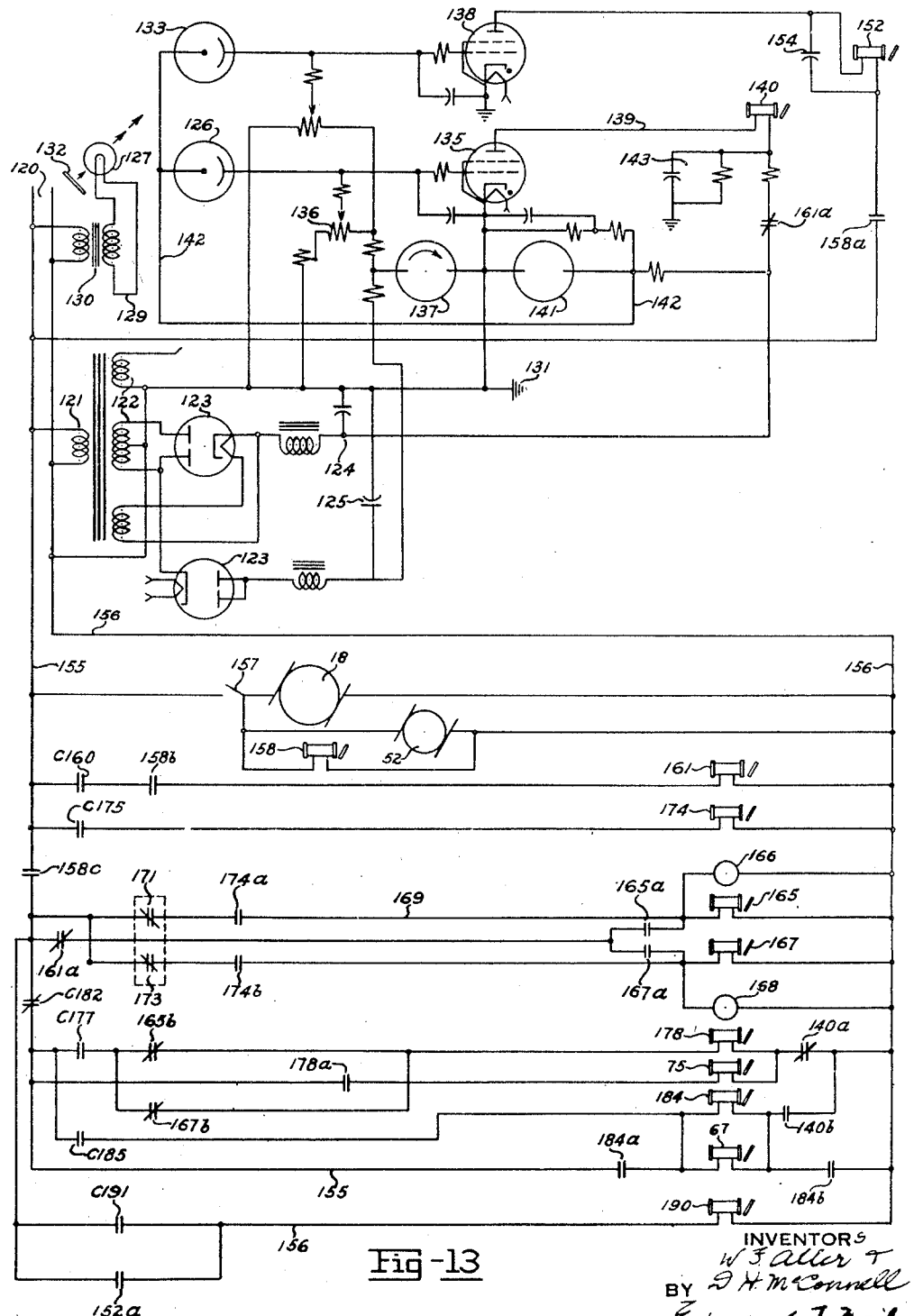

Nov. 8, 1949 W. F. ALLER ET AL 2,487,629
GAUGING DEVICE FOR PISTON RINGS AND OTHER OBJECTS
Filed Oct. 26, 1945 7 Sheets-Sheet 7

INVENTORS
W. F. Aller
BY D. H. McConnell
Edward T. Noe
ATTORNEY

Patented Nov. 8, 1949

2,487,629

UNITED STATES PATENT OFFICE 2,487,629

GAUGING DEVICE FOR PISTON RINGS AND OTHER OBJECTS

Willis Fay Aller and David H. McConnell, Dayton, Ohio, assignors to The Sheffield Corporation, Dayton, Ohio, a corporation of Ohio Application October 26, 1945, Serial No. 624,896

7 Claims. (Cl. 88—14)

This invention relates to gauging devices and more particularly to devices for measuring or comparing the size or shape of objects.

One object of the invention is the provision of a gauging apparatus for gauging a circular workpiece, such as a piston ring or the like, and comprising a work holder for receiving the workpiece and adapted for rotation on its own axis, with means for projecting a light beam substantially parallel to the axis of rotation and along the contacting walls of the workpiece and the work holder, and a light sensitive device to receive the light passing between said walls and control the gauging operation, the device being arranged and constructed for rapidly gauging and selecting a series of workpieces in an automatic and accurate manner.

Another object of the invention is the provision of a gauging device in which piston rings, or the like, are automatically supplied to a gauging station and are automatically moved through the gauging station, with provision for gauging the rings in their course of movement to determine whether or not they conform to a predetermined peripheral shape.

Another object is the provision of a gauging device having a supply position where a series of annular workpieces, such as piston rings, may be stacked one above the other with means for moving the lowest of the rings from the stack and compressing the ring before the ring is moved to a rotatable holder in which the periphery of the ring is gauged.

Another object is the provision of a gauging device having a rotatable holder with cooperating optical means for checking the contour of the ring during rotation of the ring with the holder, the holder being so arranged that as one workpiece is moved into position, in a direction axial of the work holder, the workpiece that was previously in the holder is dropped out of the holder and is received on an inclined trough or track.

Another object is the provision of a gauging device for piston rings, or the like, having a feed plate provided with an arcuate surface and cooperating with an abutment also having an arcuate surface, the abutment plate and feed plate being relatively moved so that the ring is compressed until the gap is closed, and the feed plate controls the gauging device in accordance with its position when the gap is closed, for gauging the size of the ring gap.

Other objects and advantages of the invention will be apparent from the following description, the appended claims, and the accompanying drawing, in which:

Fig. 1 is a perspective view of a gauging device embodying the present invention;

Fig. 2 is an end view of the gauging device, with the end wall removed;

Fig. 3 is a top plan view of the gauging device, a portion of the upper wall of the housing being broken away to show one of the movable track sections;

Fig. 4 is a vertical section on the line 4—4 of Fig. 3;

Fig. 5 is a section on the line 5—5 of Fig. 3;

Fig. 6 is a detail showing the stationary abutment plate;

Fig. 7 is a detail showing the feed plate;

Fig. 8 is a section of the abutment plate on line 8—8 of Fig. 6;

Fig. 9 is a section of the feed plate on line 9—9 of Fig. 7;

Fig. 10 is a timing chart showing the time sequence of operations;

Fig. 12 is a detail of the device shown in Fig. 11, showing the yielding connection between the feed plate and its operating arm;

Fig. 13 is a wiring diagram showing the electrical connections and corresponding to the form of invention shown in Fig. 11, the timing chart of Fig. 10 also corresponding to this same arrangement;

Fig. 16 is a diagrammatic view showing the path of light beams in the modification corresponding to Figs. 10, 11 and 12.

Figure 14:
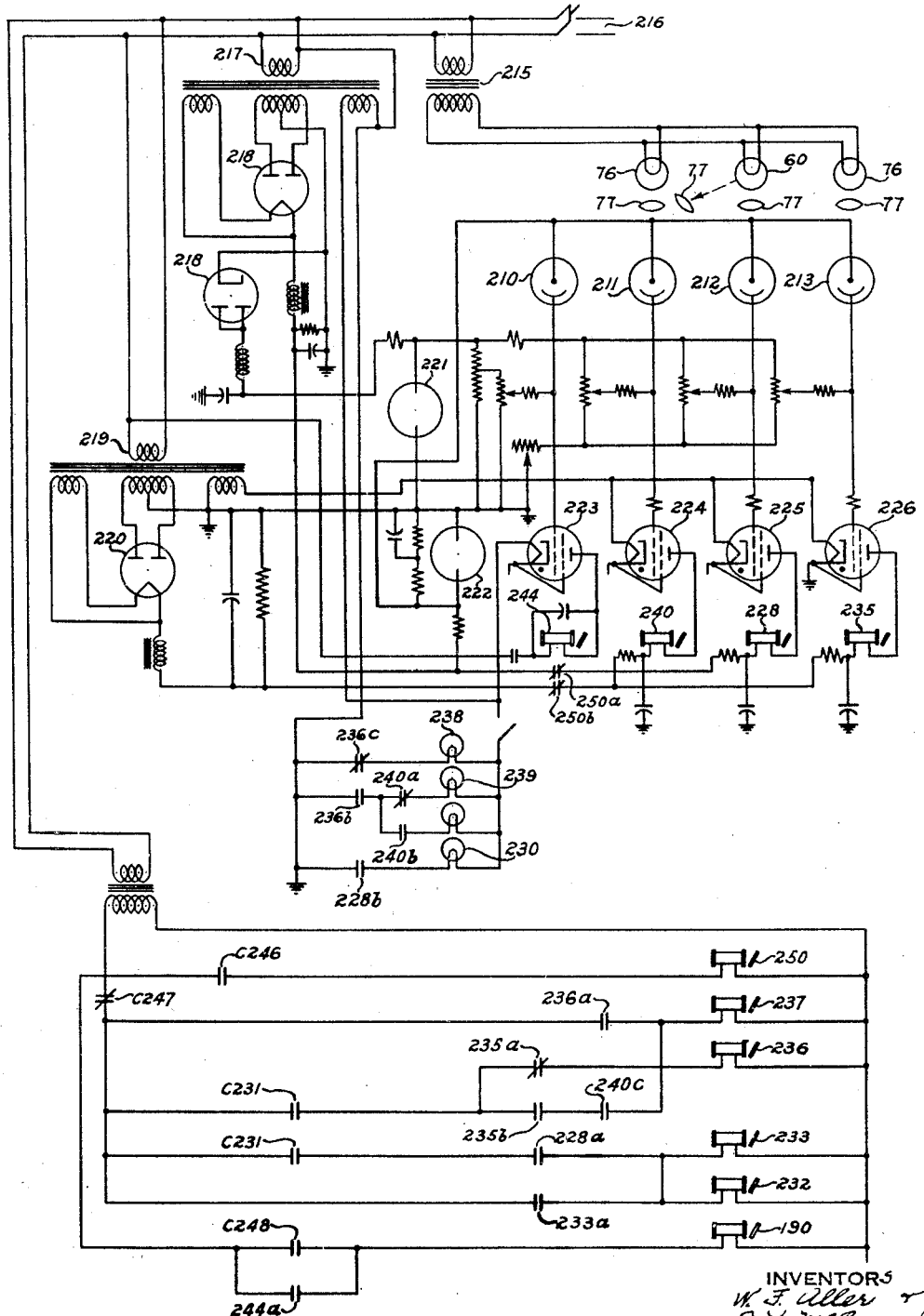
Fig. 14 is a wiring diagram corresponding to the modification of the invention shown in Fig. 1, in which the piston ring gap is gauged during the rotation of the ring with the holder.

Referring more particularly to the drawing, Figs. 1 to 9 inclusive show one form of the invention in its adaptation for checking piston rings although obviously the invention can be adapted for checking other workpieces. In the particular form shown, however, the device comprises a main housing structure 10 providing a platform 11 with a fixed cross-plate 12 bolted in place. Guide strips 13 fixed on the platform and underlying the cross-plate 12 serve to guide a reciprocating feed plate 14 which is automatically moved back and forth by a suitable motor drive, as shall be presently explained. Rising from the cross-plate 12 are retainer posts 15. A stack of workpieces, such as piston rings, one of which is shown at 16, may be placed on the feed plate 14 between the three spaced posts 15. The apparatus may then be set in motion by energizing the drive motors, and the rings are then automatically supplied, from the bottom of the stack to a point above a rotatable gauging ring or work holder where they are compressed. They are then forced downwardly into the work holder which has a diameter corresponding to the size of the cylinder in which the rings are intended to operate. The work holder then rotates the ring, optical means being provided so that a light beam is passed between the outer surface of the workpiece and the inner surface of the gauging ring or work holder if the fit between the piston ring and the work holder does not conform to the desired standard. The light is received by a light responsive device which controls gauging and selecting devices that determine the path the gauged ring takes when it leaves the work holder so that those rings that satisfy the required standard automatically move to one receiver and the rings that fail to pass the required gauging test automatically move to another receiver. Still another path of movement is provided for those rings that fail to meet the gauging test on the length of the ring gap when the ring is compressed to the same extent that would prevail while in a piston of the proper size, this gauging of the ring gap also being carried out, in the form of apparatus illustrated in Figs. 1 to 9, during the rotation of the workpiece with the work holder.

As shown more particularly in Figs. 1 and 4, the feed plate 14 is moved back and forth by a motor 18 which drives a cam shaft 19 having cams 20 and 21 which respectively operate the arms 22 and 23 of a lever 24 pivotally supported at 24' on a portion of the frame structure. The cam 20 serves to rock the lever 24 clockwise as viewed in Fig. 4, while the cam 21 moves the lever counter-clockwise. The upper end of the lever 24 is connected by a link 25 to the bracket 26 fixed on the lower side of the feed plate 14.

The feed plate 14, as shown in Figs. 6 and 7, cooperates with a fixed abutment plate 28 to compress the ring after the ring has been moved from the bottom of the stack of rings. The abutment plate 28 is of segmental form, having a cylindrical abutment surface 29 with a radius of curvature substantially the same as the cylinder in which the ring is intended to operate. The feed plate 14 also has an arcuate surface 30, and when the feed plate is moved to its ring compressing position, the piston ring will be compressed between the two surfaces 29 and 30 to substantially the diameter of the cylinder in which the ring will operate. The plate 14 is provided with a ledge 32 and shoulders 33 extending between the upper surface of this ledge 32 and the upper surface of the plate indicated at 34. The ledge 32 supports the lower side of the piston ring as the ring is moved from the supply position to the compression position, and the shoulders 33, where they contact the piston ring, move the expanded ring forward as the plate moves. The ledge 32 is received in a recess 35 in the abutment plate 28 when the two plates are closed together. As the feed plate closes against the fixed abutment plate, the workpiece is squeezed or compressed until its diameter is a predetermined value, the shape of the cam 20 being such that the feed plate is moved to properly compress the piston ring at the end of the feed movement of the plate. In the position of the parts shown in Fig. 1, the feed plate 14 has been moved part way towards the compression position, one ring 16 being in position where compressing starts, leaving the ring that was above it free to descend to rest on the upper surface 34 of the feed plate.

After the piston ring is compressed it is forced downwardly into the rotatable gauging ring or work holder, as will be presently described, and the feed plate returns to the retracted position shown in Fig. 3 so that the stack of rings again descends until the lowermost ring of the stack rests on the ledge 32 and on a small fixed supporting bar or projection 37 carried by the lower side of the centrally arranged post 15 (see Fig. 1). The feed plate 14 is provided with a groove 38 to receive the bar 37.

After the ring is compressed by the feed plate in conjunction with the abutment plate, as previously described, it is moved axially downwardly by a plunger 39 carrying a spider 40 having fingers provided with radial rollers 41. These rollers contact the upper surface of the compressed piston ring and move the ring bodily downwardly from between the abutment and feed plates and into the rotatable work holder or gauging ring 42. The plunger 39 is moved at the proper time by means of a lever 43 pivoted at 44 and moved by a drive link 45 (see Figs. 1 and 4). The lower end of the drive link is pivotally connected to a rock lever 46 controlled by another cam on the cam shaft 19. A spring 47 moves the drive link 45 upwardly as permitted by the cam drive for lever 46, to normally maintain the spider 40 spaced above the path of the feed plate, and as shown in Fig. 4.

The work holder 42, as shown in Fig. 5, is an annular member having a cylindrical gauging surface 49, of limited axial extent and adapted for contact with the peripheral surface of the piston ring. The ring 16 is shown in Fig. 5 in the position to which it is forced by the spider 40 when that member reaches the limit of its downward travel. Above the gauging surface 49, the inner surface of the gauging ring is preferably slightly bevelled and there is a bevel providing a conical surface 50 below the cylindrical surface 49, so that as another ring is moved into position by the spider 40 it will force the ring which is already in the gauge ring downwardly and the tension exerted by the ring on the conical surface 50 will cause the ejected ring to continue its downwardly movement and fall into an inclined trough or track 51.

The gauge ring 42 is continuously rotated by a motor 52 which drives a pinion 53. The pinion meshes with gear teeth on a gear ring 54 fixed on the lower side of the gauging ring 42. A series of three rollers 56 pivotally carried on the supporting frame engage the lower side of the gauging ring 42 and serves to support it and the gear ring 54. Additional rollers 57 rotatable on vertical axes engage the periphery of the ring 42 and definitely locate the axis of the ring with respect to the supporting frame. As the piston ring is rotated with the gauging ring, the periphery or contour check is made, and a sizing operation is carried out to determine whether or not the ring gap is too large or too small or falls within the required tolerance.

Arranged on a mounting bracket 59 is a lamp 60 which projects a beam of light vertically downwardly through a lens 61 and through a groove 62 in the abutment plate 28 and then through a hole 63 which is provided in the track or trough 51 (see Figs. 3, 4). Arranged below the hole 63 is a light responsive relay 212 shown in Fig. 5 and in the wiring diagram Fig. 14, and if sufficient light passes between the periphery of the piston ring and the cylindrical surface 49 of the gauging ring 42 to cause the light responsive relay to respond, it will select or energize a suitable relay mechanism that will be described so that a portion or section of the track or trough will be moved when the gauged ring moves down the trough. Those rings that satisfy the tolerance requirements of the gauging operation, when ejected from the gauging ring 42, travel along the track 51 and fall onto a collecting or receiving post 64 at the rear of the apparatus. Those rings that fail to pass the periphery check, permitting the passage of too much light between the piston ring periphery and the inner surface of the gauging ring 42, will start down the trough but will be laterally deflected because of the upward movement of the track section 65 pivotally carried at 66 and controlled by a solenoid 67 under the control of the periphery gauging light responsive element. A similar track section 68 (see Fig. 4) remains in its normal position as shown in that figure to support the other side of the descending piston ring, assuming the gap distance of that ring conforms to the required tolerance dimensions. With no support for one side of the ring, due to the lifting of the track section 65, that side drops, the center ridge 69 below the track receiving the lowered center portion of the gauged ring which is thus so tilted laterally that it descends through the lateral trough 70 and falls onto the collecting post 71 (see Fig. 2). If the gap does not conform to the desired size, the gap gauging device causes energization of a solenoid 75 to lift the track section 68 on its pivotal support 72 so that the ring will be tilted laterally and will descend through the trough 73 and be collected on the collecting post 74.

In this embodiment of the invention the gap distance is gauged during the rotation of the workpiece with the gauging ring 42, the gauging operation being carried out by the light beams projected downwardly from two lamps 76, one of which is shown in Fig. 4. Below each of these lamps is a lens 77 which projects beams downwardly past grooves 78 in the abutment plate 28 and through holes 79 and 80 in the trough 51 (see Fig. 3). Arranged in line with the light beams passing through the holes 79 and 80 and below those holes are two light responsive devices or tubes 211 and 213, see Fig. 14, one to see if the gap is too large and the other to see if the gap is too small. When the piston ring gap comes in line with the light beam to the tube 211, if the gap is undersize there will be an insufficient energization of the tube to fire or energize it and it will not conduct current to set the relay or gauging circuit. If the gap is within tolerance or too large the tube 211 will be energized and operate the gauging circuit. Light coming to the tube 213 will effect the control of the gauging circuits if the gap is too large, but if the gap is undersize or of a predetermined proper range of size, this tube will not effect the gauging circuits which will remain in their normal positions.

To prevent the passage of light to the light sensitive tube that checks the peripheral contour of the piston ring, at the instant the gap moves past that tube, a solenoid 190 (see Fig. 5) is energized. This energization, which is controlled by an electric circuit affected by an auxiliary light beam passing through the gap from the lamp 60 to the tube 210 takes place just before the ring gap passes the periphery checking tube and the energization of solenoid 190 continues until the gap has passed. This solenoid 190, when energized, rocks a lever 191 to project a slide or shutter 192 to the left to the position as viewed in Fig. 5. There are holes in this shutter that normally permit the passage of light beams to the tubes 211, 212, and 213, but when the shutter is projected, as mentioned, light is blocked from the tube 212 and from the tubes 211 and 213.

Figures 11, 15:
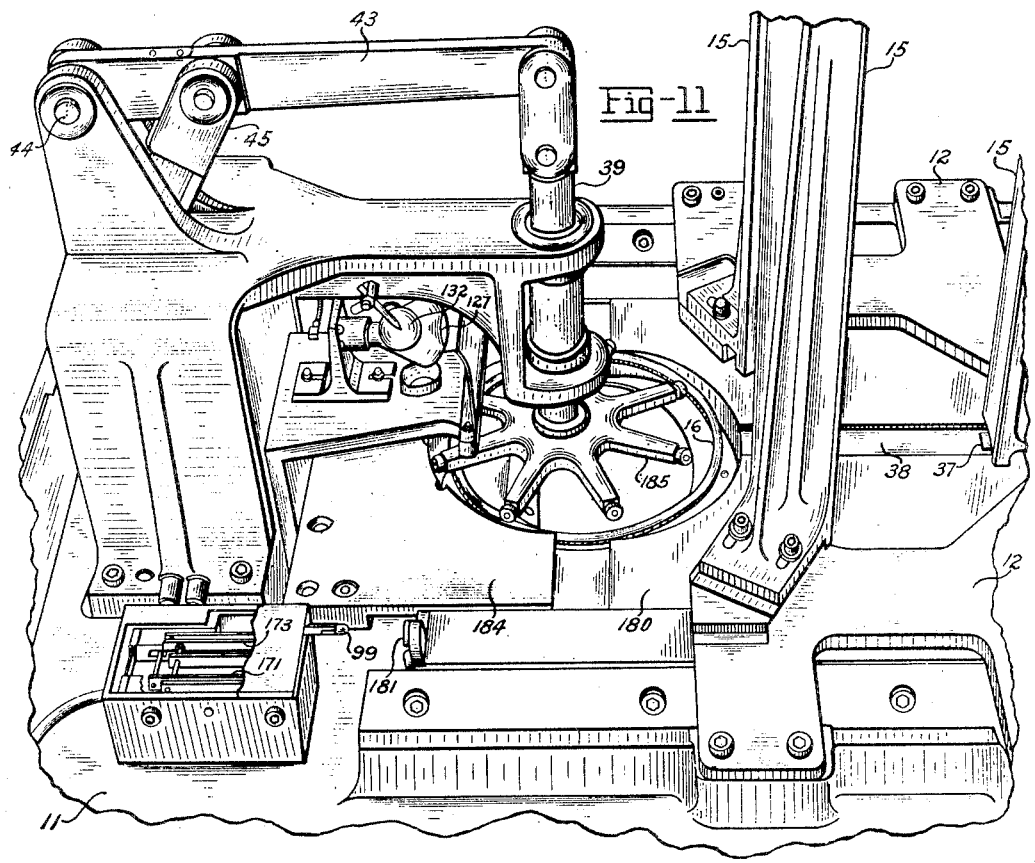
Fig. 11 is a perspective view showing a slightly modified form of the invention, where the feed plate compresses the ring against the abutment plate to close the gap in the ring and operates a gauging device which gauges the ring gap before the ring is applied to the rotatable holder.
Fig. 15 is a timing chart corresponding to Fig. 14.

In the form of the invention shown in Fig. 11, the ring gap is gauged as an incident to its movement to the gauging ring, the construction of this form of the device corresponding to the form of construction shown in Figs. 1 to 9 except as will be particularly pointed out. As shown in Fig. 11, the feed plate 180 is provided with a lug 181 which comes up into engagement with a gauging plunger 99 substantially at the end of its feed stroke. The movement of the feed plate 180, instead of being positive and of a fixed definite length of stroke, is effected through a yielding drive so that the feed plate continues to move to compress the piston ring until its gap is entirely closed. The drive link 25 shown in Fig. 4 is thus replaced by the drive link 25' illustrated in Fig. 12. This drive link is made in two sections 92 and 93 and a rather strong compression spring 94 normally holds the two sections together but permits the link to lengthen when the motion of the feed plate is stopped by the closed piston ring during the continued forward feed movement of the lever arm 24. The drive link 25' is of such length that the slide 180 will move far enough to compress piston rings and completely close the gaps even though the gaps are oversize.

When the piston ring gap is closed by the joint action of the feed slide 180 and the abutment plate 184, and before the spider 185 moves downwardly to push the piston ring into the rotatable gauging ring, the extent of movement of the feed slide is determined to gauge the piston ring gap. This is accomplished by gauging switches 171 and 173 controlled by the gauge plunger 99. The switches 171 and 173 may be operated by the gauging plunger 99 in the manner disclosed in Patent 2,384,519, granted September 11, 1945. The two switches 171 and 173 will both be closed when the piston ring gap is within the required tolerance limits. If the gap is too small the slide 180 will not travel quite as far and the switch 173 will be open. If the gap is too large, the switch 171 will open. These switches control the gauging and selecting circuits as will be more fully described.

After the gap of the ring is gauged, the spider 185 forces it down into the rotatable holder or gauging ring and the periphery check is made during its rotation in that ring. For this purpose the lamp 127 provides a light beam that travels past the inside of the gauging ring and the outer periphery of the piston ring. If the fit of the ring permits the passage of light sufficient to energize the light responsive device in line with this beam a gauging circuit is effective on a selecting circuit. A shutter is provided that blocks off the passage of light when the gap itself is passing by this main beam, the shutter being operated by a circuit which is controlled by light reflected from a mirror 132 and traveling at an angle through the gap just before the gap reaches the main beam as will be more fully explained.

As to a more complete description of the operation of the construction shown in Fig. 11, 120 in Fig. 13 designates a suitable supply source connected to the primary winding 121 of a transformer. The secondary windings 122 of the transformer are connected to rectifier tubes 123 supplying rectified current at a positive potential to point 124 and a negative potential to a point 125. 126 is the light responsive relay or tube, such as a No. 930 tube, that is arranged directly below the light source or lamp 127. This lamp is connected through wire 129 to a transformer secondary 130 so that it will remain energized during the gauging operations. Light beams emitted from the lamp 127 and transmitted by the reflector 132 pass at an angle to the vertical through the gap in the ring, when the gap comes into the line of the beam, and are received by the second light responsive device 133, preferably another No. 930 tube.

If sufficient light passes from the lamp 127 to the tube 126 to make that tube conduct current, as in case of a poor ring contour, the grid potential of a relay tube 135 will be affected. The grid of this tube 135 is connected through a potentiometer circuit 136 to a relay tube 137 such as a VR-90 tube that maintains a constant bias voltage to the grid of the tube 135 and also to the grid of a similar tube 138 having a grid connected to the tube 133 in a similar manner. A tube 141 similar to the tube 137 is provided to maintain a stabilized supply of current of constant voltage to the lead 142 connected to both the tubes 126 and 133. Normally the tube 135 has no substantial flow of current in its plate circuit as its grid potential, with respect to its cathode, is such that it will not conduct current. When this grid potential is changed sufficiently by energizing the tube 126, a current flow takes place through the plate circuit 139 energizing a winding 140 then through a normally closed switch 161a and back to the point 124 of positive potential. 143 designates a filter circuit connected to winding 140. When light is received by the tube 133, at a time just prior to the time the ring gap passes the beam from the lamp 127 to the tube 126, then energization of this tube 133 provides current flow from the plate of the tube 138 through a winding 152, then through a switch 158a closed during motor operation by energization of a winding 158 during motor operation, and back to one side of the transformer primary 121, the other side being connected to ground at 131. Connected across the winding 152 is a condenser 154 which keeps the relay coil energized some small time after current flow ceases from the plate of 138 due to the stoppage of light supply to the tube 133. This time is sufficient to keep the coil 152 energized until the piston ring gap has passed the beam from lamp 127 to tube 126 so that the periphery checking light beam will not energize tube 126 when the gap passes.

Connected to the supply source 120 are lead wires 155 and 156. A motor switch 157 can be closed to supply current to the motors 18 and 52, and when the switch 157 is closed a current flow takes place through the winding 158 closing the switch 158a previously mentioned and closing a normally open switch 158b which is arranged in series with a cam controlled microswitch C160 operated from the cam shaft 19. The timing of this switch C160 is shown in Fig. 10, the switch being normally open and closing for a short time after the completion of the compression stroke of the feed plate. When the switch C160 closes, it energizes the winding 161 to momentarily open a normally closed switch 161a.

Switch 161a is arranged in a gauging circuit in series with two holding switches 165a and 167a. Switch 165a is connected in series with and controlled by a winding 165. A green lamp 166 is preferably connected across this winding. Switch 167a is arranged in series with and controlled by a winding 167 having a red lamp 168 connected across it. When either of the coils 165 or 167 are energized, their respective lamp bulbs will be lighted and a holding circuit will be completed through their respective switches 165a and 167a. The coil 165 is connected through wire 169 to a normally open switch 174a then through a switch 171 to the wire 155. The coil 167 is connected through a normally open switch 174b then through switch 173 to the wire 155. Switches 174a and 174b are both closed when a coil 174 is energized by closing a microswitch C175 which is automatically operated by the cam shaft 19 as indicated opposite "gap timer switch" in Fig. 10. If the switches 173 and 171 are both closed when the gap timer microswitch C175 closes, circuits will be completed through both coils 165 and 167, energizing both the red and green lamps 168 and 166 for visual indication and then after the switch C175 opens again circuits will be maintained through these coils 165 and 167 through the switches 165a and 167a and the closed switch 161a until that switch 161a is later opened to interrupt the gauging circuit.

The two switches 171 and 173 are operated by the gauging plunger 99 controlled by the feed slide of the machine and both of these switches will be closed when the piston ring gap is within the required tolerance. If the piston ring gap is too large and the feed slide moves over farther than it should, it opens the switch 171. If the ring gap is too small, the feed slide will not travel far enough to close the switch 173. If either of these two switches are open at the time of the gauging operation there will be no current flow through their respective coils 165 and 167.

When one or the other of the two coils 165 and 167 is energized, due to the failure of the piston ring being gauged to comply with the required gap tolerance, the coil that is energized will open one or the other of two switches 165b and 167b whichever it controls. If both switches 171 and 173 are closed because the ring gap size is satisfactory, both coils 165 and 167 will be energized and their respective switches 165b and 167b will be open, and therefore the rejection coil 178 cannot be energized. The two switches 165b and 167b are connected in parallel from the lead wire 155 through a cam controlled microswitch C177 which effects the transfer of the setting of the gauging circuit relays 165 and 167 at the proper time, as shown in Fig. 10, over to the selecting circuit in which the switches 165b and 167b are arranged. If either of these two switches are closed, a circuit will be completed through a winding 178 which will close a switch 178a, and after passing through winding 178 the current travels through a normally closed peripheral checking switch 140a to the other side of the line 156. The switch 140a is controlled or opened when the coil 140 is energized due to sufficient light traveling from the lamp 127 to the peripheral checking light sensitive device 126 so that if the periphery does not satisfy the required standard, the switch 140a will render the gap rejecting circuit inoperative and the periphery gauging circuit will take precedence. However, assuming the periphery satisfies the required standard and the coil 140 is not energized, then the coil 178 will be energized if the gap is either too large or too small as previously mentioned, and at the same time the rejection solenoid 75 that controls one side of the track or trough will be energized to lift that section of the track and cause the lateral travel of the gauged piston ring to the receiver 74. The circuit from closed switch 140a through the solenoid 75 will be completed through the switch 178a held closed by energized winding 178 to connect the solenoid directly to the wire 155 until the reset microswitch C182, which is normally closed, is momentarily opened to normalize the rejection solenoid 75. The switch C182 is controlled by a cam on the cam shaft 19 as indicated in Fig. 10.

If the periphery of the piston ring does not conform to the required standards and the light passage to the tube 126 is then sufficient to cause current flow to the plate of tube 135, to coil 140, the energization of that coil will close a normally open switch 140b connected in series with a coil 184 and a microswitch C185 which is controlled by the cam shaft 19 with the same timing as the microswitch C177. Energization of the coil 184 closes the switch 184a connected to one side of the line 155 and to the periphery rejection track lifting solenoid 67 to lift the track section 66 and cause lateral movement of the gauged piston ring to the receiver 71. A switch 184b, closed when the coil 184 is energized, connects the rejection solenoid 67 to the lead wire 156 even though switch 140b is subsequently opened, and maintains current flow through the rejection solenoid 67 until the microswitch C182 opens later in the cycle for resetting the selection circuit.

The lead wire 156 is also connected through a shutter controlling solenoid 190 in series with the microswitch C191 controlled by a cam on the cam shaft 19 to temporarily close during the time the piston ring is being loaded into the rotating gauging ring 42 so that the passage of light during that time past the periphery of one or both of the piston rings in the rotatable gauging ring 42 will not effect energization of the tube 126. The shutter controlling solenoid 190 is also connected from one side of the line to the other through the switch 152a closed by winding 152 when that winding is energized due to the light flow to tube 138 at the time the piston ring gap permits such light passage. Condenser 154 maintains a temporary energization of the coil 152 to prevent light passage through the gap when the gap passes the beam to the periphery checking tube or light responsive device 126.

Current supplied to the entire gauging circuit and the selecting circuit is interrupted by opening switch 158c which is controlled by the relay coil 158, when the motor switch 157 is opened and the coil 158 is de-energized.

As will now be apparent, the gauge head containing the switches 171 and 173 set up the gauging circuit in accordance with whether or not the ring gap is too large or too small or conforms to the required tolerance condition and the gauging circuit is maintained even after the actual gauging time is past. The setting of the gauging circuit is transferred to the selecting circuit because that is effective later in the cycle and to permit the gauging circuit to be then normalized so that the next ring will be gauged while the selecting circuit for the previously gauged ring is effective to control the course of the ejected ring along the track. Those rings that pass the required standard for both periphery shape and ring gap will travel straight down the track since neither of the track lifting rejecting solenoids 67 nor 75 will be energized. If the ring periphery does not conform to the required standard, the solenoid 67 will be energized, regardless of the size of the ring gap. If the periphery is satisfactory but the ring gap is too large or too small, the other side of the track will be lifted by solenoid 75 to select just those rings having an improper gap size for collection on the post 74.

Fig. 14 shows the wiring connections and Fig. 15 the timing chart particularly applicable to the embodiment of the invention illustrated by Figs. 1 to 9 inclusive, where the ring gap is checked during the rotation of the piston ring with the gauging ring 42. The operation of the various selecting and gauging circuits is somewhat similar to the operation of the construction illustrated in Figs. 11 and 13. The lamps 76 and 60 are connected to the secondary of a transformer 215 supplied from a power source 216. A transformer 217 supplies current to rectifier tubes 218. Another transformer 219 supplies current to another rectifier tube 220. These tubes are connected to the voltage regulating relay tubes 221 and 222, preferably VR-90 tubes. The cathodes of the light responsive tubes 210 and 213 inclusive, which are preferably 930 tubes, are connected to the control tubes 223, 224, 225 and 226 respectively, these being preferably 2050 tubes.

If sufficient light is passed from the light source 60 to the tube 212 to cause sufficient energization of the grid 227 of the tube 225, current will flow from the plate of that tube to the relay winding 228, which closes switches 228a and 228b. The latter energizes a red lamp 230, while the switch 228a serves to complete a circuit, when a cam controlled switch C231 is closed, through the solenoid 232 that controls the rejection of the piston ring by operating one side of the track along which the ring slides after it has moved from the gauging ring. This switch also energizes a solenoid 233 which closes switch 233a, and the energization of the relay 232 will then be maintained, once the switch C231 closes, until the circuit is interrupted later in the cycle by a cam operated switch shown at C247.

If the piston ring has a gap that is too small there will not be enough light passing from the lamp 76 to the tube 213 to energize the grid of the tube 226 sufficiently to make that tube conduct current and consequently the relay 235 connected to this plate circuit will not be energized. Relay 235 controls switches 235a and 235b. The switch 235a will thus remain closed and the switch 235b will remain open. Closed switch 235a, energizes a relay 236 controlling the normally open switch 236a. The latter maintains current through the gap rejection solenoid 237 which elevates the other side of the track to divert the checked piston ring from its straight-through path along the slide. Energized relay 236 also controls normally closed switch 236a and normally open switch 236b, connected respectively to yellow and green lamps 238 and 239.

If the gap in the ring is of normal size or over size, sufficient voltage will be supplied to the grid of the tube 226 to cause a current flow through the relay 235 and change the switches 235a and 235b, de-energizing the relay 236 so that the gap rejection solenoid 237 will not operate. However, if the gap is too large, when it comes opposite the tube 211 there will be sufficient energization of that tube to energize the control tube 224 so that current flow will take place through the relay winding 240. This relay controls switches 240a, 240b and 240c. Switch 240c will be closed if the gap is oversize, closing a circuit through switch 235b which had previously been closed, then relay 236, thus closing switch 236a and energizing the gap rejection solenoid 237.

Just before the gap comes in line with the light responsive tube 212, a beam reflected from the mirror adjacent the lamp 60 passes through the gap to the tube 210, energizing tube 223 so that the current flows through the relay winding 244. This winding, when energized, closes a switch 244a in circuit with solenoid 190 that controls the shutter so as to temporarily block off light from the periphery gauging lamp.

The timing of the operations corresponding to Fig. 14 are shown in Fig. 15. Cam operated switches C246, C247, C248, and the switch C231 previously mentioned are connected in the various circuits to produce the proper timing sequence so that the selection circuits will be set up by the gauging circuits, permitting the gauging circuits to be then normalized so that the next ring will be gauged while the selecting circuit for the previously gauged ring is effective to control its course along the track. Switch C246 when closed energizes winding 250 which opens switches 250a and 250b. Those rings that pass the required standards for both periphery shape and ring gap will travel straight down the track since neither of the track lifting rejection solenoids will be energized.

While the forms of apparatus herein described constitute preferred embodiments of the invention, it is to be understood that the invention is not limited to those precise forms of apparatus, and that changes may be made therein without departing from the scope of the invention which is defined in the appended claims.

What is claimed is:

1. An apparatus for gauging a circular workpiece such as a piston ring, comprising a support, having means for holding a stack of the workpieces, a work holder rotatably mounted on said support at one side of the stack holding means and adapted for telescopic engagement with the workpiece, a slide reciprocally operable on said support for moving the workpieces one at a time from the bottom of the stack to a loading position adjacent the work holder, means operable in timed relation to the slide movements for moving a workpiece from the loading position to the work holder, means for projecting a light beam substantially parallel to the axis of rotation and along contacting walls of the workpiece and work holder, a light sensitive device for receiving light passing between said walls, and gauging means controlled by said light sensitive device for gauging the periphery of the workpiece.

2. An apparatus for gauging a circular workpiece such as a piston ring, comprising a support, a work holder rotatably mounted on said support and adapted for telescopic engagement with the workpiece, a motor having a driving connection with said workholder to rotate the work holder about its own axis, a plunger mounted for reciprocal movement on said support in line with the work holder for supplying a workpiece to the work holder through one end thereof while the work holder remains on the support, drive means for operating said plunger in timed relation to said driving connection, said work holder having a limited area for engagement with the workpiece and said supplying means having a predetermined limit of movement whereby the supply of a new workpiece forces the workpiece in the work holder outwardly through the other end thereof, means for projecting a light beam substantially parallel to the axis of rotation and along the contacting walls of the workpiece and work holder, a light sensitive device for receiving light passing between said walls, and gauging means controlled by said light sensitive device.

3. An apparatus for gauging a circular workpiece such as a piston ring, comprising a support, a work holder rotatably mounted on said support and having a cylindrical ring receiving surface, means for projecting a light beam along said cylindrical surface, a light sensitive device for receiving light passing between said surface and the ring, gauging means controlled by said light sensitive device for gauging the peripheral form of the workpiece, power means for rotating said work holder, a slide slidably mounted on said support for feeding the workpieces successively from a supply station at one side of the work holder in a direction transverse of the work holder axis and into alignment with the cylindrical surface of the work holder and immediately adjacent the work holder, and a plunger reciprocally mounted on said support concentrically with said cylindrical surface to automatically supply a workpiece to the workholder during rotation of the work holder, and means for operating said plunger in timed relation to said slide.

4. An apparatus for gauging a circular workpiece such as a piston ring comprising a support, a work holder rotatably mounted on said support and having a cylindrical ring receiving surface, means for projecting a light beam along said cylindrical surface, a light sensitive device for receiving light passing between said surface and the ring, gauging means controlled by said light sensitive device, power means for rotating said work holder, an abutment on said support having a segmental surface adjacent and in line with a portion of the cylindrical ring receiving surface of said work holder, a feed plate operably mounted on said support for moving a ring against said abutment, said feed plate having a segmental portion cooperating with the segmental portion of the abutment to compress the piston ring in a location in line with the cylindrical ring receiving surface of the work holder, means for moving said feed plate towards and from the abutment, and means for supplying the compressed ring from the feed plate and abutment to said work holder.

5. An apparatus for gauging a circular workpiece having a gap between its ends, comprising a support, a work holder rotatably mounted on said support and having a circular wall to receive the workpiece, means for projecting a light beam along said wall between the wall and the workpiece, a light sensitive device for receiving light passing between the workpiece and the wall, gauging means controlled by said light sensitive device for showing an abnormal contour of the workpiece, means operably mounted on said support for supplying workpieces in a direction at an angle to the axis of rotation of the work holder to a point closely adjacent to the work holder and for compressing the workpiece in a position in line with the circular wall of the work holder to close the gap in the workpiece, gauging means operated by said supplying and compressing means in accordance with the extreme position it attains in the compressing movement for gauging the closed outside diameter of the workpiece, means for moving the workpiece from the supplying and compressing means to the work holder, and means for operating said supplying means and said moving means in timed relation with the rotational movement of the workholder.

6. An apparatus for gauging a circular workpiece such as a piston ring, comprising a support, a work holder rotatably mounted on said support and having a cylindrical wall for receiving the workpiece, an abutment fixed on said support adjacent said work holder having an arcuate wall adjacent the work holder for cooperation with one side of the workpiece, a feed plate operably mounted on said support and having an arcuate wall cooperating with the abutment and movable toward said abutment to compress the ring so the gap closes, means for gauging the extent of travel of the feed plate to thereby gauge the ring gap, means for supplying the ring from between the feed plate and abutment into said work holder, and means for gauging the peripheral contour of the ring during its rotation in the work holder.

7. An apparatus for gauging a circular workpiece as set forth in claim 1 said work holder having a limited area for contact with the workpiece positioned therein and so that a new workpiece supplied to the work holder forces the one in the work holder outwardly therefrom.

WILLIS FAY ALLER.
DAVID H. McCONNELL.

REFERENCES CITED

The following references are of record in the file of this patent:

UNITED STATES PATENTS

| Number | Name | Date |
|--------|------|------|
| 888,772 | Wilkinson | May 26, 1908 |
| 1,204,026 | Johnson | Nov. 7, 1916 |
| 1,306,744 | Brenzinger | June 17, 1919 |
| 1,310,837 | Murch | July 22, 1919 |
| 1,611,441 | Higgins | Dec. 21, 1926 |
| 1,618,965 | Herrmann | Feb. 22, 1927 |
| 2,138,645 | Rey | Nov. 29, 1938 |
| 2,177,133 | Desch | Oct. 24, 1939 |
| 2,433,558 | Hurley | Dec. 30, 1947 |
| 2,441,343 | Becker | May 11, 1948 |
| 2,448,314 | Kavanagh | Aug. 31, 1948 |